(12) United States Patent
Vollmerhausen

(10) Patent No.: US 11,391,623 B2
(45) Date of Patent: Jul. 19, 2022

(54) ENHANCED LIGHT DETECTOR

(71) Applicant: Richard H. Vollmerhausen, Lake Mary, FL (US)

(72) Inventor: Richard H. Vollmerhausen, Lake Mary, FL (US)

(*) Notice: Subject to any disclaimer, the term of this patent is extended or adjusted under 35 U.S.C. 154(b) by 0 days.

(21) Appl. No.: 16/870,941

(22) Filed: May 28, 2020

(65) Prior Publication Data
US 2021/0372850 A1    Dec. 2, 2021

(51) Int. Cl.
*G01J 1/04* (2006.01)
*G02B 6/293* (2006.01)
*G01J 1/44* (2006.01)

(52) U.S. Cl.
CPC .......... *G01J 1/0414* (2013.01); *G01J 1/0425* (2013.01); *G01J 1/0437* (2013.01); *G01J 1/0448* (2013.01); *G01J 1/44* (2013.01); *G02B 6/29355* (2013.01)

(58) Field of Classification Search
CPC ...... G01J 1/0414; G01J 1/0425; G01J 1/0437; G01J 1/0448; G01J 1/44
See application file for complete search history.

(56) References Cited

U.S. PATENT DOCUMENTS

| 6,661,361 B1 * | 12/2003 | Lewis | G01J 9/0246 341/137 |
| 10,727,952 B1 * | 7/2020 | Vollmerhausen | H04N 5/06 |
| 2019/0025482 A1 * | 1/2019 | Lee | G02B 5/201 |

\* cited by examiner

*Primary Examiner* — Kevin K Pyo
(74) *Attorney, Agent, or Firm* — Joseph Profeta

(57) ABSTRACT

Methods for design and production of highly sensitive active and passive light detecting devices and systems. Orders of magnitude improvement in optical signal detection is made possible in high noise or low contrast scenes. The current invention creates a small spectral difference between two parts of a split light stream. When recombined, the altered light streams partially correlate, and that generates fall amplitude signal oscillation at a frequency that depends on the constituent spectrum. The full amplitude signals and spectrum dependent oscillation make signal discrimination much better than intensity-only methods. The effect of read noise, amplifier noise, dark current noise, and thermal noise due to photo detector shunt resistance, become less important when compared to light detection using prior art methods.

4 Claims, 4 Drawing Sheets

ENHANCED LIGHT DETECTOR

FIELD OF THE INVENTION

This application discloses a method for improving the sensitivity of light detection in active and passive optical systems.

OBJECT OF THE INVENTION

There is a market need for improving the sensitivity of passive imagers, range finders, laser range gated imagers, and other optical systems and devices in commercial and tactical uses.

The invention described here provides orders of magnitude improvement in the ability to detect optical signals when the signals are corrupted by high noise or low contrast.

For example, the invention described here improves the signal to noise ratio of a 4.4 to 4.5 micrometer passive thermal imager by two orders of magnitude under poor thermal contrast conditions when tree-to-ground thermal contrast is 0.1 degree Kelvin. On hot, sunny days, when thermal contrast is ten or more degrees Kelvin, the signal to noise ratio only improves by a factor of two.

Further, the signal to noise ratio improvement results from larger signals and not from lower noise; sensing large signals makes practical implementation easier.

BACKGROUND DESCRIPTION OF THE PRIOR ART

With almost all thermal imagery and in many applications involving light in the reflective spectrum regions, the signal of interest is low contrast. That is, the signal of interest rides on a large light pedestal. That pedestal creates shot noise, which obscures the signal of interest.

In FIG. 1, picture 7 shows the thermal image of a vehicle, labeled 1; graph 8 is a plot of the radiance (the thermal energy) emitted from the line down the outline of the vehicle, indicated by line 3. The abscissa 5 in graph 8 indicates vertical pixel position in picture 7. The ordinate 6 in graph 8 is radiance intensity in watts per square centimeter. So 3a in Graph 8 is the radiance along the line 3 in Picture 7.

The vehicle is hot, particularly the engine, labeled 4. The active vehicle 1 is considered a much hotter thermal emitter than the background 2. However, looking at the radiance plot, all parts of the scene including the terrain background 2 emit thermal energy as shown by radiance level 2a. Thermal scenes are low contrast. Compare radiance intensity 4a from the vehicle's engine with radiance 2a from the background. The hottest part of the vehicle, the engine, radiates less than ten percent more signal than terrain radiance 2a. That is because the background is at 300 degrees Kelvin temperature whereas the vehicle's engine is only 20 or 30 degrees hotter. We sense the thermal difference to background as hot, but the absolute energy being radiated from the two objects is not substantially different. Thermal images depict small variations in thermal signal across the scene.

The picture in FIG. 1 has good contrast because the display brightness adjustment is used to set black level to the background radiance. That is, with very poor contrast thermal imagery, the contrast is enhanced prior to display.

In FIG. 2, plot 26 shows scene radiance and plot 29 shows display luminance. In plot 26, the abscissa, 33, is scene position and the ordinate, 32, is radiance intensity; the small intensity change, 25, on a large average signal, 24, indicates low contrast. In plot 29 the abscissa, 35, is display position and the ordinate, 34, is display luminance. The display brightness control is used to increase the ratio of target luminance, 27, to background luminance, 28, and that improves display contrast. However, the noise in the imager is still based upon the radiance level, 24.

Poor contrast imagery is inherent in thermal imaging, with expected terrain contrast averaging between one and three percent on a good thermal day and much less under rainy, cold conditions. Good quality reflective imagery can have 20 to 25 percent contrast. However, scattering of light in the atmosphere results in low contrast imagery in the reflective spectral bands. The current invention enhances both reflective and thermal signals.

To summarize the prior art in optical signal detection, both background radiation in the thermal spectral bands, and atmospheric scattering in the reflective spectral bands, result in the wanted optical signals riding on top of a large light pedestal. The result is that the signals to be detected are small intensity differences on top of large intensity pedestals, and the large intensity background light creates shot noise that inhibits signal detection.

BACKGROUND DESCRIBING INVENTION OPERATING PRINCIPLES

Because the engine is hotter than the terrain, the wavelength spectrum of signals 4a in FIG. 1 is slightly different from the emission spectrum of the background, 2a. The current invention uses that small difference in spectral radiance to differentiate between background and vehicle radiation.

In the reflective spectral bands, the emissivity of terrain, vegetation, and other objects varies with wavelength. The current invention, again, uses these spectral differences to enhance detection of the signals of interest.

The light detection method described herein applies to spatially and temporally coherent and incoherent light including sunlight, starlight, light bulbs, arc lamps, light emitting diodes, laser light, thermal emissions in the mid wave, long wave, and extreme infrared, plus terahertz and millimeter wave radiation.

If any light, coherent or incoherent, is split into two light streams, and the path lengths of both streams are nearly equal when the two streams are recombined, then the intensity of the interference pattern in an interferometer depends cosinusoidally on the path length difference between the two light streams. See FIG. 3, where the abscissa, labeled 10, is optical path length difference and the ordinate, labeled 9, is intensity (normalized power amplitude).

As the optical path length difference varies from zero to one wavelength (a phase angle difference of two pi radians), cross-correlation of the two light streams results in a cosinusoidal variation from double incoherent intensity to zero and back to almost double incoherent intensity.

The graph in FIG. 3 is for light with a coherence length of about 7 wavelengths. That coherence length might represent a passive mid wave infrared imager with a 4.4 to 4.7 micron spectral band. The cosinusoidal pattern shown in FIG. 3 would extend through more periods (i.e., the amplitude of the intensity swings would fall off more slowly) if the light had a narrower spectral bandwidth.

The light detection method described in this invention uses two properties of light. The first property is that light correlates with a copy of itself as long as the temporal offset between the copies is small.

The second property of light is the fact that if the whole spectrum correlates with itself, then there is also a consistent relationship between each part of the light spectra. That is, if the two light streams are spectrally filtered in a different way but the phase difference is kept near zero, then the correlation between the two light streams will be time varying, but the beat frequency signal will be near full amplitude.

Light can be split optically in an interferometer that uses mirrors and plate beam splitters, fiber optics, or waveguides fabricated in numerous different ways. In this invention, fiber optics and silicon photonic (Complementary Metal Oxide Semiconductor or CMOS) waveguides are used for the examples and preferred embodiments.

Both fiber optics and silicon waveguides are sometimes generically referred to in this invention as waveguides. Both technologies implement the splitters, couplers, and photo diode interface that can comprise the invention.

The incoming light is split into two parts, then the wavelength spectrum of one light stream is attenuated slightly over a small part of the constituent spectral band. After the splitter, the average wavelengths of the two light spectra are slightly different.

When the two light streams are re-combined, modifying one spectrum relative to the other results in a beat pattern. The frequency of that beat pattern depends upon both the spectral filter applied and the spectral nature of the sensed light.

The current invention modulates the incoming light at a frequency that depends upon the light's wavelength spectrum. Since all of the light from each point in the scene is modulated, the photo detectors act on full amplitude signals from the engine, from the background, and so on. In this manner, the invention both increases the signal amplitude and changes the frequency of modulation that differentiates the engine from the background. As a result, shot noise has less effect on signal detection.

Also, since the signal is larger, the effect of read noise, amplifier noise, dark current noise, and thermal noise due to photo detector shunt resistance, become less important when compared to light detection using prior art methods.

BRIEF DESCRIPTION OF THE DRAWINGS

The thermal picture and radiance plot in FIG. 1 illustrates the low contrast associated with thermal imagery.

DETAILED DESCRIPTION OF THE PREFERRED EMBODIMENTS

Figure 1:
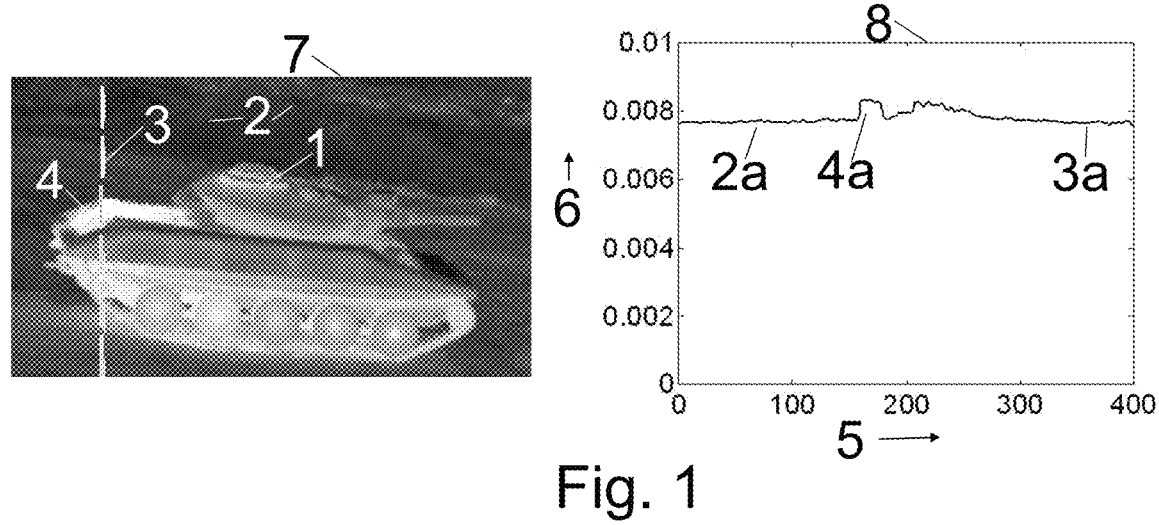
Figure 2:
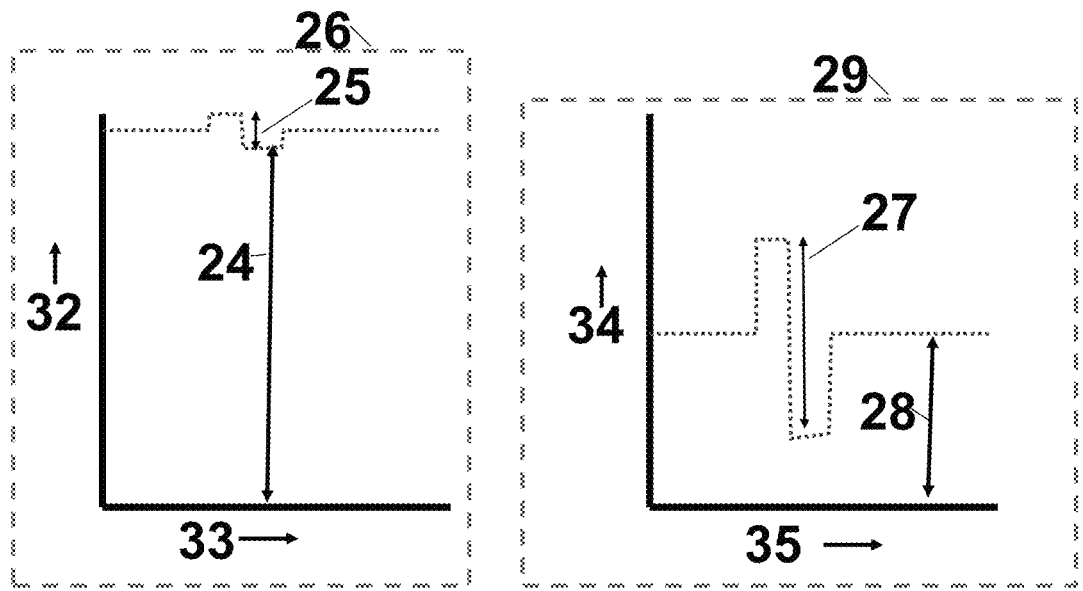
FIG. 2 illustrates how the low contrast radiance image is displayed with high contrast.

Implementation and performance provided by the invention varies with various applications. That is, the invention is implemented differently and has distinct benefits for staring imaging and for scanning imaging.

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities, dimensions, spatial characteristics, compositional characteristics and performance characteristics may be used explicitly or implicitly herein, but such specific quantities are presented as examples only and are approximate values unless otherwise indicated. Discussions and depictions pertaining to these, if present, are presented as examples only and do not limit the applicability of other characteristics, unless otherwise indicated.

In describing preferred and alternate embodiments of the invention, specific terminology is employed for the sake of clarity. The technology described herein, however, is not intended to be limited to the specific terminology so selected, and it is to be understood that each specific element includes all technical equivalents that operate in a similar manner to accomplish similar functions.

The drawing uses a combination of electrical symbols, logic symbols and pictorial representations to illustrate the elements of the invention. In the interest of clarity the symbols are simplified and do not explicitly show unneeded detail.

Example embodiments will now be described more fully with reference to the accompanying drawing of invention. Specific details are set forth such as examples of specific components and methods to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known device structures are not described in detail.

The invention has the potential to be configured in multiple versions so as to achieve superior technical performance in any given application. It is understood that in some configurations not all elements will always be necessary for the specific embodiment or implementation of the invention. It should also be apparent that there is no restrictive one-to-one correspondence between any given embodiment of the invention and the elements in the drawing.

Implementation of an imaging camera providing M by N pixels requires circuitry for synchronization, global or progressive shutter logic, row and column read-out, analog-to-digital conversion, non-uniformity corrections, and display formatting, to name some of the necessary functions. The many camera functions are well known to those skilled in the camera art, and a description of the implementation of many necessary camera functions is not provided in this disclosure.

The focus of the explanatory material in this disclosure is describing the implementation of the mechanism that improves signal detection.

Description of the Staring Imager Embodiment

This section describes the implementation of a two-dimensional pixel array used for imaging.

Figure 4:
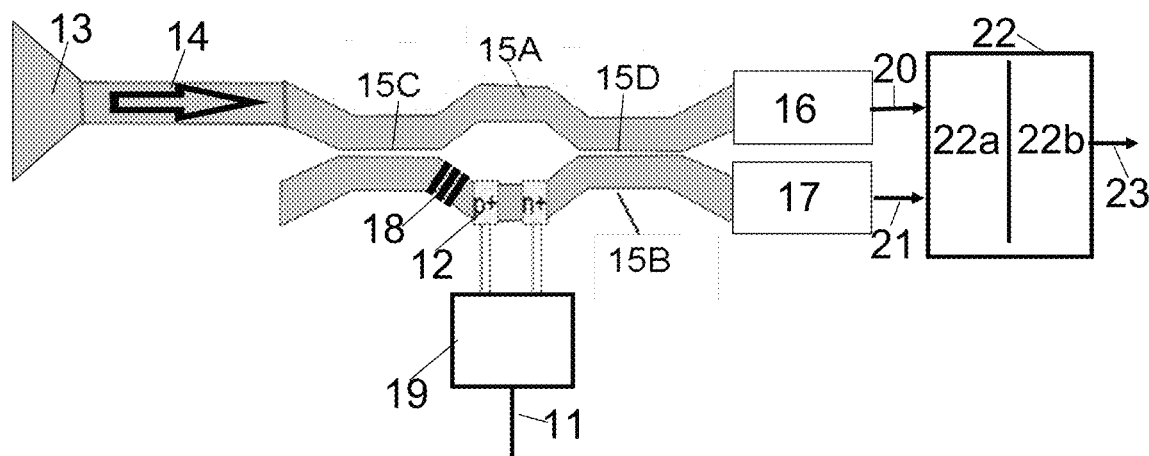
FIG. 4 illustrates the parts that can comprise a pixel in a passive staring imager.

FIG. 4 illustrates one set of components that can comprise a pixel in a staring array. In FIG. 4, item 13 represents a light collector that can be a Bragg Grating or a J-Coupler or any other known type of photonic construct that collects scene light and transitions that light to a waveguide and a polarization diversifier, 14. Polarization diversifiers convert all polarizations of incoming light into a single electro-magnetic mode, consistent with the waveguides 15a and 15b. Polarization diversifiers are optional; they improve light collection efficiency.

Two waveguides, 15a and 15b, constitute a Mach Zehnder Interferometer (MZI). The waveguides 15a and 15b come into close proximity at regions 15c and 15d to form evanescent couplers. The light entering 15a at the junction of 14 to 15 is split at 15c into equal parts in waveguides 15a and 15b. The nano-feature 18, deposited on, or etched into, waveguide 15b, applies a spectral filter that rejects a small amount of the light from the splitter 15c.

The coupler regions 15c and 15d need not depend on evanescent behavior, particularly if the incoming light spectral band is narrow. The couple and split regions can be two joined waveguides or fiber optics.

Electrical inputs 11 control current mirror 19 that provides current to PIN diode 12. Those skilled in the waveguide art know that, by varying current through the PIN diode 12, the phase difference between light in waveguides 15a and 15b can be kept close to zero; this means that the two light streams exhibit near full amplitude intensity changes as the phase of the light in the two interferometer arms is varied.

The use of a PIN diode to control relative phase in 15a and 15b is an example; other methods, like controlling the temperature of each waveguide 15a and 15b are also effective at controlling the phase difference of the light in the two interferometer arms.

Figure 3:
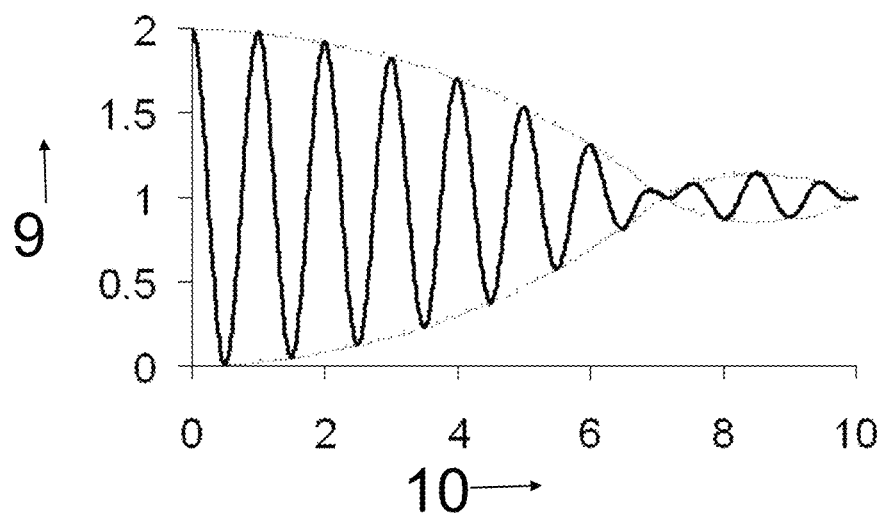
FIG. 3. plots the intensity versus phase difference of light that is split and then re-combined in an interferometer.

The two light streams are partially recombined at the evanescent region 15d. Since the light in waveguide 15b has been spectrally filtered, the two light streams are correlated but not equal. The degree of spectral difference between the two light streams depends upon the spectral filter 18 and also upon the innate spectrum of the incoming light. Since the light streams are correlated but have slightly different spectral properties, the result is a beat frequency in photo detectors 16 and 17 rather than the stable interference pattern shown in FIG. 3.

Electrical outputs 20 and 21 in FIG. 4 sense both the intensity and the temporal frequency difference caused by the spectral difference between the light streams in the two interferometer arms.

The frequency of the beat pattern in Hertz is approximately calculated by multiplying the speed of light by $D_L$ and dividing by the product of $L_1$ and $L_2$, where $L_1$ and $L_2$ are the mean power-weighted wavelengths in the two MZI arms, and $D_L$ is the difference $L_2$ minus $L_1$. The beat frequency is 15.5 GigaHertz (GHz) for a one nanometer wavelength difference at a mean wavelength of 4.4 micrometers. The power weighted wavelength difference comparing a 300 degree K to a 301 degree K temperature change is 1.7E-14 micrometers. That wavelength difference creates a 265 Kilohertz (KHz) beat frequency in the photo diodes. The detailed numbers provided in this paragraph are presented as examples to help understand the general principles.

The light reaching the photo diodes 16 and 17 in FIG. 4 oscillates at full amplitude from zero to double incoherent intensity, at a temporal frequency that depends on the characteristic of the input light. Slight variations in radiant intensity in the image become frequency differences in a strong alternating current (AC) signal.

The electrical circuit 22 senses both amplitude and temporal frequency of photo detector signals 20 and 21. Circuit 22a is an electronic high pass filter; circuit 22b incorporates a signal integrator, reset, and pixel select logic to output the pixel signal to a digitizer via electrical lines 23.

Electronic 22 outputs an amplitude signal on 23 that is proportional to both the amplitude and the frequency of the signal difference between 20 and 21.

The invention disclosed here comprises a means to couple light from a lens, an antenna, an optical fiber, or a mirror, into an optical fiber or a waveguide. The optical fiber or waveguide conveys light to a splitter that spectrally rejects part of the light in one of the waveguides, thence to a phase adjustment mechanism, an evanescent coupler, and two photo diodes which sense the light out of both sides of the evanescent coupler.

Even very small differences in the wavelength of the light in the two interferometer arms cause cycling of the light out of the evanescent coupler from zero intensity to twice that intensity directly sensed by a square law photo detector, in which the cycling frequency is proportional to the mean power-averaged difference in wavelength.

The photo detectors 16 and 17 add shot noise, but that noise has little effect on the frequency sensing of the full-amplitude intensity cycles.

The nature of the evanescent coupler means that small changes in the characteristic of incoming light cause full-amplitude cycling of the light between two photo detectors, with a cycling frequency that is proportional to the wavelength change.

Description of the Scanning Imager Embodiment

Using one or a few photo detectors to sense the whole field of view either shortens detector dwell time or increases the background shot noise. In either case, a staring arrangement provides better signal to noise ratio. For that reason, top of the line prior art imagers use staring arrangements with one photo detector to view each point in the scene.

A limitation of the staring format is that it restricts pixel area and limits the photonics circuitry (that is, the electronics and waveguide structures) that can be incorporated into each staring pixel.

A scanning arrangement enables flexibility in the layout of the photo detector focal plane array, but the poor sensitivity associated with prior art limits the utility of scanned imagers.

The improved signal to noise ratio provided by the invention described herein makes the sensitivity performance of scanned imagers commensurate with or better than current state of the art staring imagers. In other words, photo detector layouts that previously were not viable due to poor imager sensitivity are made viable by the current invention.

The preferred scanning imager embodiment uses Pseudo Noise Codes (PNC). PNC are also known as maximal length shift register sequences. PNC provide the "multiplex advantage." That is, each point in the scene has a dwell time slightly greater than half a frame time. Therefore, PNC provides large signals.

However, the noise is also large, because half the photon flux from the entire field of view continuously impinges on the photo detector.

PNC form a bi-orthogonal function set. That is, different phases of PNC correlate among themselves and cross-correlations are a non-zero, fixed value. The fixed value of cross correlations can be ignored or, alternatively, the value is easily determined and subtracted.

PNC are used to sample many pixels simultaneously, thereby providing a long dwell time for all the pixels in an image. Pixel signals are multiplexed by the camera electronics by sampling many pixels at the same time in a planned sequence. Since the pixel signals are multiplexed using bi-orthogonal PNC, the value of individual pixels can be calculated in the camera processor.

The scanning imager embodiment separates light collection from light detection, thereby providing room on the photonics array for separating the sensed light into many spectral bands.

Figure 5:
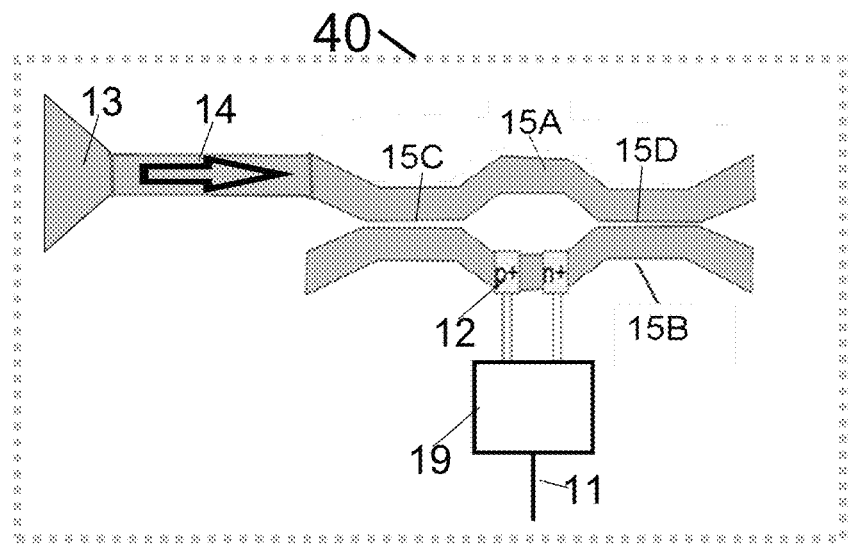
FIG. 5 illustrates the parts that comprise a Light Collection Site (LCS) used in a scanning imager configuration.

FIG. 5 illustrates a Light Collection Site (LCS), 40. The LCS 40 has the same components as a staring array pixel in FIG. 4, except the photo detectors 16 and 17, electronics 22, and spectral inhibitor 18 are omitted. See the FIG. 4 description of 11, 12, 13, 14, 15, and 19. In this embodiment, the MZI 15 is used as an optical switch to direct pixel light to one of two waveguides.

Figure 6:
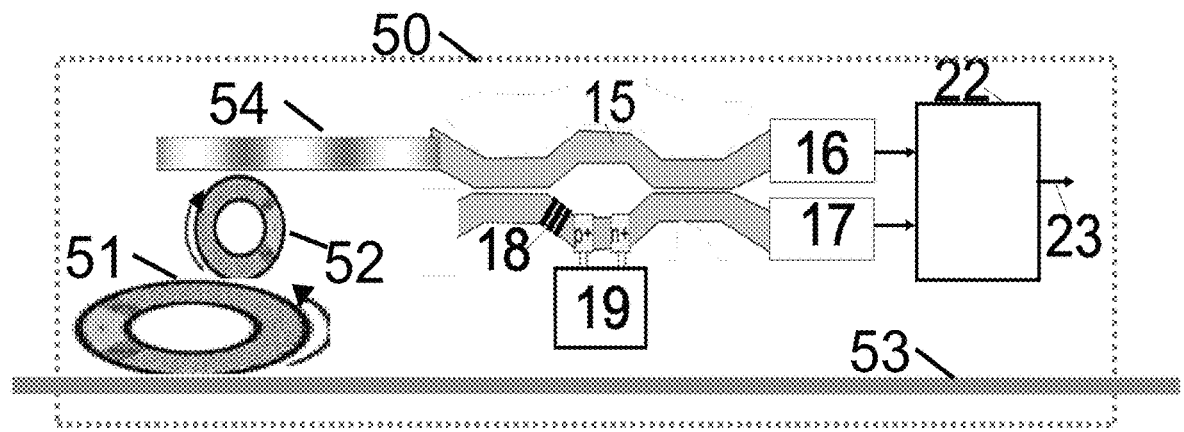
FIG. 6 illustrates a spectral filter using ring and racetrack resonators with the filter output sensed by the invention described here.

FIG. 6 shows, a spectral filter, labeled 50, which integrates the invention's method of photo detection. The configuration of multiple ring or racetrack resonators 51 with embedded PIN diodes 52 determines the spectral nature of the light that is diverted from the add-waveguide 53 to the drop-waveguide 54. Light not in the spectral band of the resonator configuration continues along the add-waveguide to additional spectral filters 50.

Light in the drop-waveguide 54 is sensed (detected) by 15 through 23 in the same manner as the photo detection described for FIG. 4.

Figure 7:
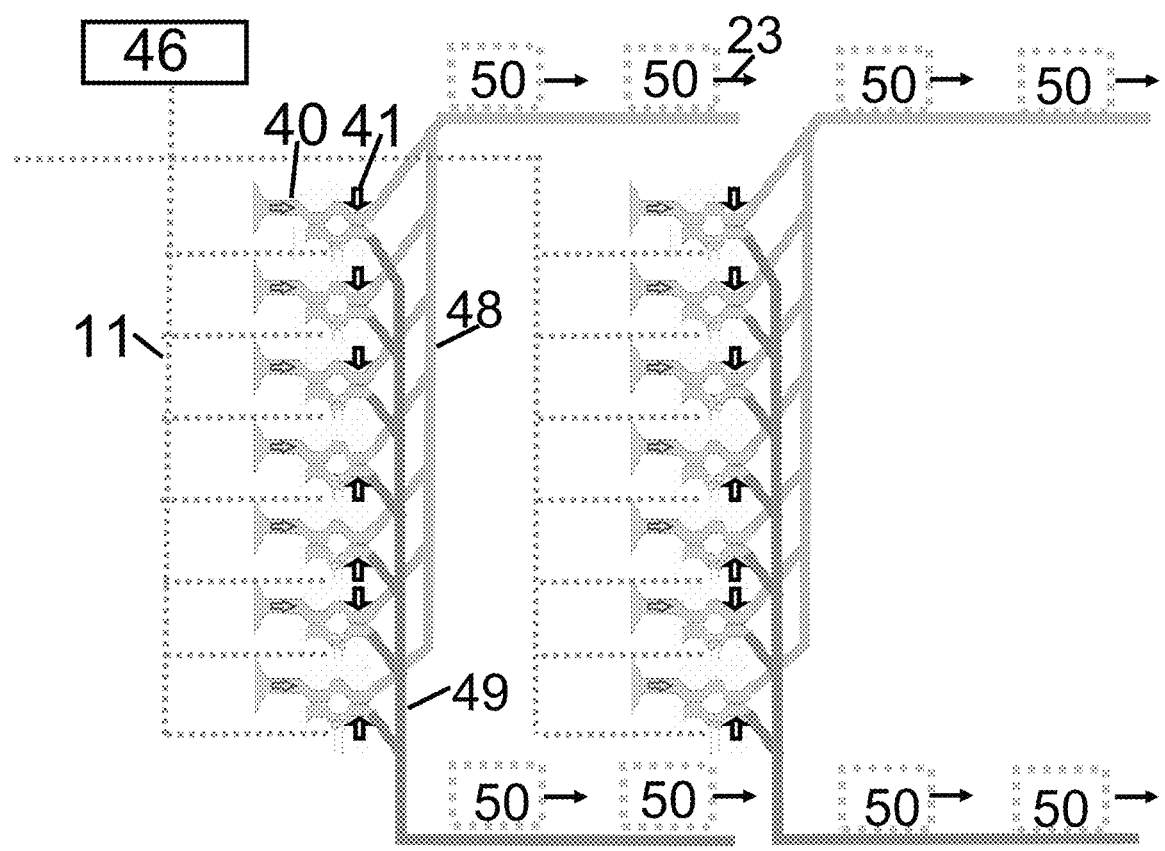
FIG. 7 illustrates the layout of a scanning imager where the spectral filters and photo detectors are remote from the LCS.

In FIG. 7, the LCS 40 devices collect light but they do not have a photo detector. The scanning pixel is distinguished from a staring array pixel by labeling it a Light Collection Site (LCS). The optical power from each LCS is switched to one of two row waveguides 48 or 49. Half the LCS in a row are switched to each of the two waveguides, but there are as many different combinations of LCS switched to each waveguide as there are LCS sites.

PNC length can be set by any N where length equals $2^N-1$. PNC multiplexing can be applied to a fraction of a row or many rows. One PNC can be used to multiplex all the LCS or only a few LCS.

Multiplexing the LCS has the advantage that high spatial resolution can be obtained to image the entire scene through the use of just a few photo detectors. Further, the photo detectors can be located off to one side; they do not need to be close to the LCS. Separating the light collection function from the photo detection function provides the space on the photonics circuit to add spectral filters and specialized electronics for each of the few photo detectors.

In FIG. 5, items 40 are LCS comprising light coupler 13, polarization diversifier 14, and MZI used as an optical switch, with switch state controlled by 11, 19, and 12 as described for FIG. 4. Unlike FIG. 4, there are no photo detectors in the LCS. Instead the light is multiplexed into two row waveguides, 48 and 49.

Waveguides 48 and 49 convey the light to a series of spectral filters, 50, illustrated in FIG. 6. The spectral filters commonly used as of the date of this application are comprised of combinations of ring and racetrack resonators, with the spectral band of the filters controlled by embedded PIN diodes. Ring and racetrack filters and their controls are well known to experts in photonic circuit design and are not described in detail here.

Ring and racetrack filters have the property that light input on the add-waveguide 53 in the spectral band of a filter 50 is output on the drop-waveguide 54. Light not passed to the drop-waveguide 54 is passed along the add-waveguide 53 to the next spectral filter. In other words, many spectral filters can be implemented along the add-waveguide 53.

In FIG. 7 the output of each spectral filter is sensed by a MZI with a spectral inhibitor 48, photo diodes 16 and 17, and electronics 22 in the same manner as described for FIG. 4. In this case, however, the electrical signal 23 is digitized and interfaced to a processor where the PNC is decoded to find the intensity value for each pixel in a row or column. The scanning arrangement provides room for a controllable spectrum inhibitor using ring or racetrack resonators, for example, rather than etching a fixed nano-feature (18 in FIG. 4) into one waveguide.

Light is collected by each LCS. Many LCS signals are multiplexed onto a small number of waveguides that convey the light to a bank of spectral filters. Each spectral filter incorporates the current invention; that is, each spectral filter incorporates the light splitting, spectral filtering, and beat detection in photo detectors that improves the sensitivity of light detection. The current invention enables highly sensitive simultaneous imaging in many spectral bands while requiring only a significantly reduced number of photo detectors.

What is claimed is:

1. A method for implementing a detection mechanism that uses a photonics arrangement for sensing or detecting a scene light, comprising:

a two dimensional array of Bragg Gratings, the Bragg Gratings gathering light from a lens image plane and funneling the light into a single mode waveguide, the single mode waveguide attached to a 50/50 splitter, one output of the 50/50 splitter has a Bragg Grating embedded into the single mode waveguide to partially reject wavelengths in the optical spectrum, another output contains light from the 50/50 splitter joined in as an evanescent coupler consisting of two arms, the light in the evanescent coupler arms being self-coherent but of different spectral content forming a spectrum-dependent beat pattern, the output of each arm of the evanescent coupler feeding light to a photo detector, each photo detector signal is fed to a frequency discriminator circuit with an output voltage proportional to a photo detector signal frequency, the output voltage signal of each photo detector is digitized and interfaced to a digital processor, the digital processor formatting image array signals for output to a display or computer.

2. The implementation method of claim 1, where a polarization diversifier is added between a scene light Bragg Grating and the single mode waveguide, wherein the scene light Bragg Grating comprising the two dimensional array of Bragg Gratings.

3. The implementation method of claim 2, where the scene light Bragg Grating is replaced with a J-coupler.

4. The implementation method of claim 2, where the scene light Bragg Grating is replaced with a horn antenna.

* * * * *